United States Patent [19]

Okamoto et al.

[11] Patent Number: 4,811,281
[45] Date of Patent: Mar. 7, 1989

[54] WORK STATION DEALING WITH IMAGE DATA

[75] Inventors: Takashi Okamoto; Akio Terasawa; Takashi Ishizaki, all of Hyogo, Japan

[73] Assignee: Mitsubishi Denki Kabushiki Kaisha, Tokyo, Japan

[21] Appl. No.: 16,341

[22] Filed: Feb. 19, 1987

[30] Foreign Application Priority Data

Feb. 20, 1986 [JP] Japan .................... 61-35708

[51] Int. Cl.⁴ .......................................... G06F 15/62
[52] U.S. Cl. .................................................. 364/900
[58] Field of Search ... 364/200 MS File, 900 MS File; 340/798, 799; 382/69

[56] References Cited

U.S. PATENT DOCUMENTS

| 4,070,710 | 1/1978 | Sukonick et al. | 364/200 |
| 4,558,412 | 12/1985 | Inoshita et al. | 364/200 |
| 4,620,289 | 10/1986 | Chauvel | 364/514 |

OTHER PUBLICATIONS

Nikkei Electronics, May 23, 1983, p. 156.

*Primary Examiner*—Thomas M. Heckler
*Attorney, Agent, or Firm*—Bernard, Rothwell & Brown

[57] ABSTRACT

A work station of a computer system capable of batch storing and retrieving image data separately from a usual data file system, equipped with a main processor, main processor memory and direct memory access (DMA) controller connected to a common bus, equipped with a graphic processor and window memory between the common bus and an image data bus, and equipped with a frame memory in connection with an image display unit on the image data bus, wherein the work station is further provided with an image data memory, e.g., disk unit, on the image data bus, a memory input/output controller lcoated between the image data memory and the image data bus for controlling image data transfer using a direct memory access (DMA) function, and an image data input unit and output unit connected to the memory input/output controller, so that mass image data can be transferred directly between the memory and input/output units under control of the memory input/output controller without going through the window memory.

5 Claims, 6 Drawing Sheets

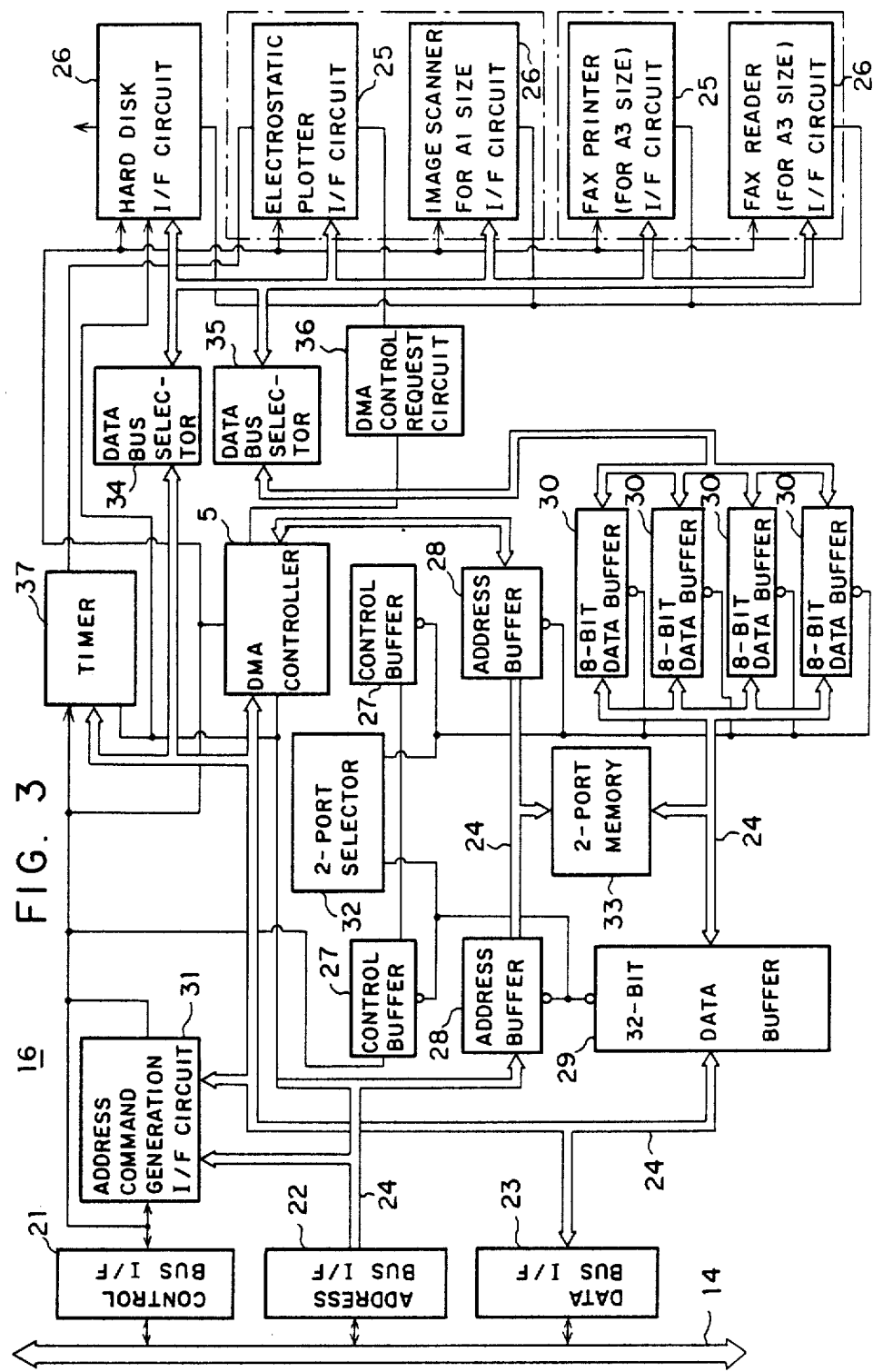

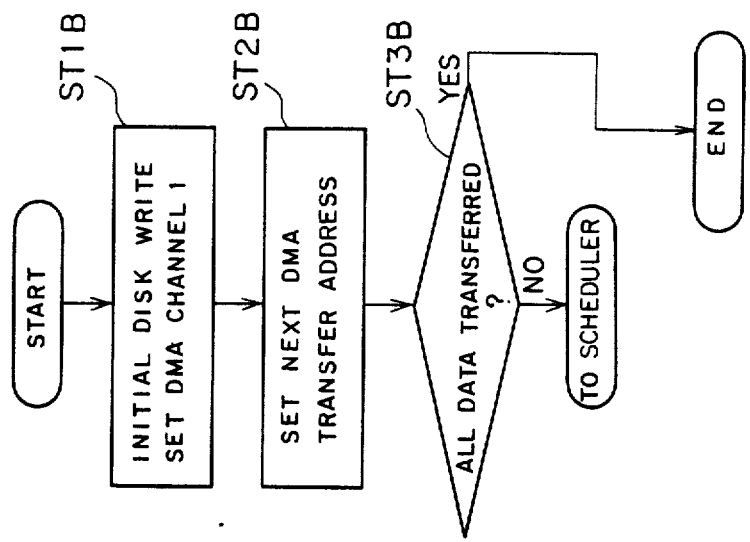
FIG. 5 INTERRUPT PROCESS
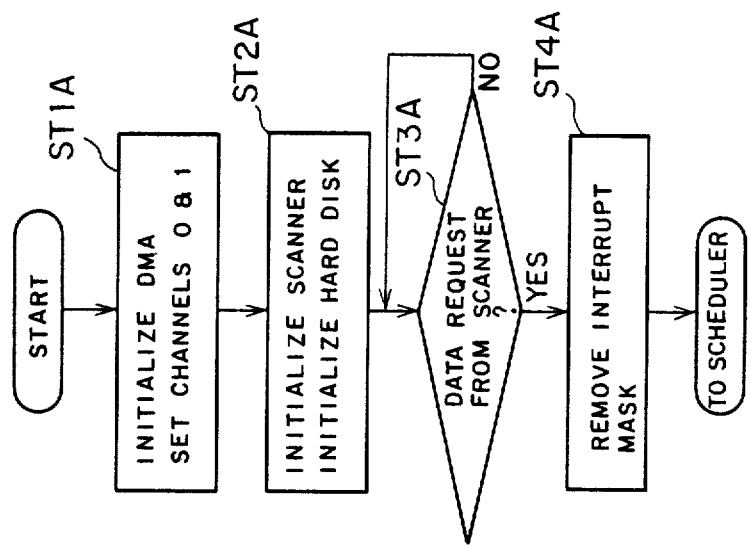
FIG. 4 INITIAL PROCESS

WORK STATION DEALING WITH IMAGE DATA

BACKGROUND OF THE INVENTION

1. Field of the Invention

The present invention relates to a work station dealing with image data and, particularly, to a work station capable of batch storing and batch retrieving image data independently of a file system and also capable of directly transferring mass image data between a disk unit and input/output unit without going through a window memory.

2. Description of the Prior Art

With recent advanced computer technology, various information processing devices associated with computers have also made a great progress. For example, a single computer can process information of several users concurrently, and the users transfer information to the computer over data buses through terminals called "work stations". A variety of information includes character data, image pattern data and audio data, and recently various types of images are digitized through pattern recognition and transferred to a computer by way of work stations and data buses so that the image information is processed by the computer.

An example of conventional work stations dealing with image data is disclosed in publication: Nikkei Electronics, p. 156, published on May 23, 1983. FIG. 1 shows in block diagram the conventional image data work station system, with a small modification being made from the above citation, which includes a main processor 1, a memory 2 associated with the main processor 1, an image data output unit, e.g., printer, 3, an image data input unit, e.g., tablet, digitizer, etc., 4, a direct memory access controller (DMA controller) 5 which implements data transfer among the image data input unit, output unit and memory, a disk unit 6 for storing image data, vector data and other file data, and a disk controller 7 for controlling the disk unit 6. The work station further includes a graphic controller (graphic processor) 8, a window memory 9 for storing image information, an input unit, e.g., keyboard, 10 used by the operator for the interactive operation with the work station (this unit will be termed "operator input unit"), a bit-map display unit 11, and a frame memory 12 for storing bit-map information to be displayed on the display unit 11. The main processor 1, memory 2, DMA controller 5, disk controller 7, graphic processor 8 and window memory 9 are connected to a common bus 13, while the graphic controller 8, window memory 9 and frame memory 12 are connected to an image data bus 14 with the ability of fast data transfer. In the system configuration of FIG. 1, the devices located above the common bus 13 will be called "higher" devices, and those located below the common bus 13 will be called "lower" devices in the following.

The operation of the above arrangement is as follows. Initially, data supplied from the image data input unit 4 by way of the DMA controller 5 is stored in the window memory 9. If it is requested to display the data on the bit-map display unit 11, the graphic controller 8 creates a screen image in the window memory 9 and transfers it to the frame memory 12. In case of storing the input image data in the disk unit 6, the screen image is transferred directly from the window memory 9 to the disk unit 6. In another case of outputting the image information to the image data output unit 3, data is retrieved from the disk unit 6, the output image is developed in the window memory 9, and it is transferred to the output unit 3 by way of the DMA controller 5.

Some types of work station do not have one or both of the input and output units 3 and 4, and are merely operative to store and retrieve image data for the bit-map display unit 11 to/from the disk unit 6.

The conventional work station dealing with image data arranged as described above stores bulky image data as a file in the disk unit under a general-purpose operating system (OS) so that it is treated in file control. On this account, time needed for making access to image data in the file is dependent on the performance of the disk driver and general-purpose operating system, and this is in general a time consuming task.

In addition, image data transfer uses the common bus a great proportion of time, and it affects other processings considerably. For a system with an additive image input/output unit, image data is transacted through the window memory, and it has been difficult to deal with image data of a large frame size (e.g., A0 and A1 sizes).

SUMMARY OF THE INVENTION

This invention is intended to overcome the foregoing prior art deficiencies, and its prime object is to provide a work station capable of easily transacting large frame image data and also capable of storing and retrieving image data at a high speed.

In order to achieve the above objective, the inventive work station handling image data incorporates an image data dedicated disk unit on an image data bus on the part of the graphic processor, with the image data input/output controller connected to that bus.

BRIEF DESCRIPTION OF THE DRAWINGS

FIG. 3 is a block diagram of the disk input/output controller shown in FIG. 2;

Figure 2:
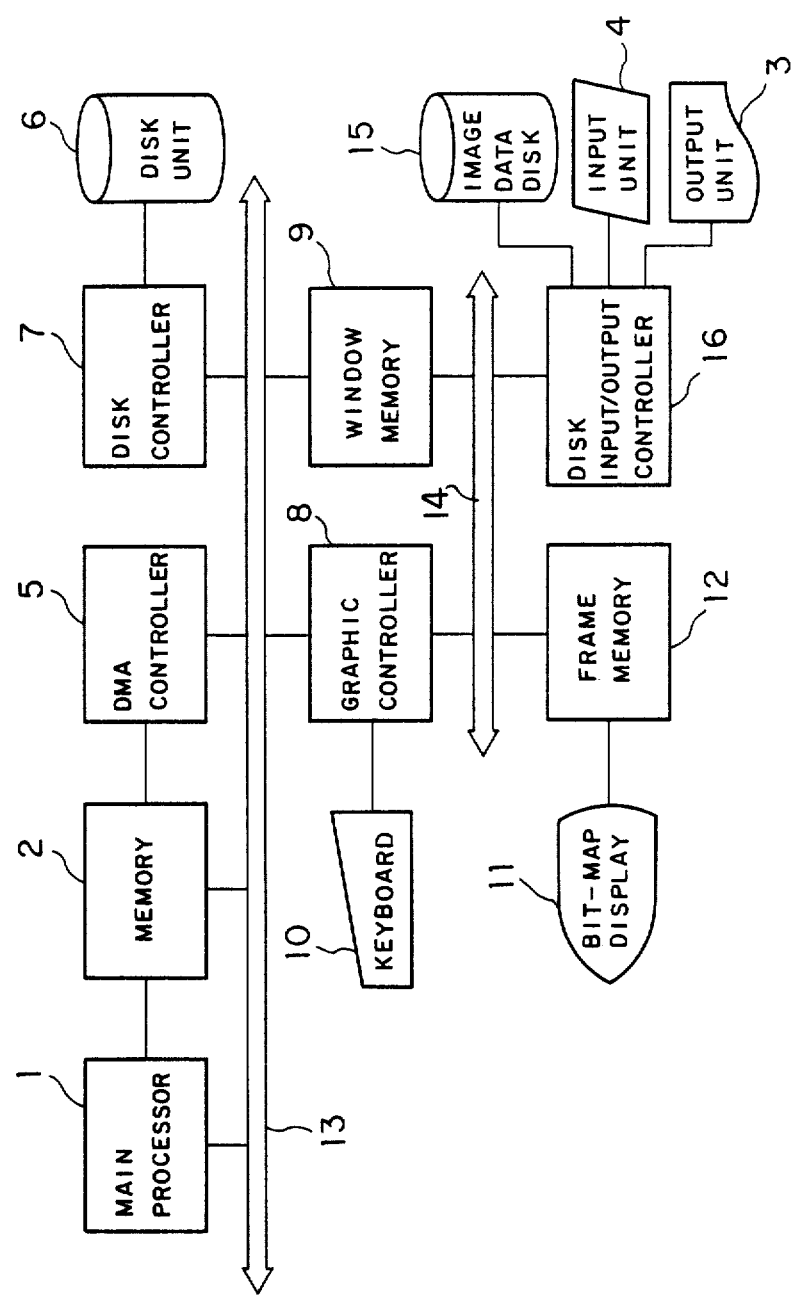
FIG. 2 is a block diagram of the work station system handling image data embodying the present invention.
Figure 6:
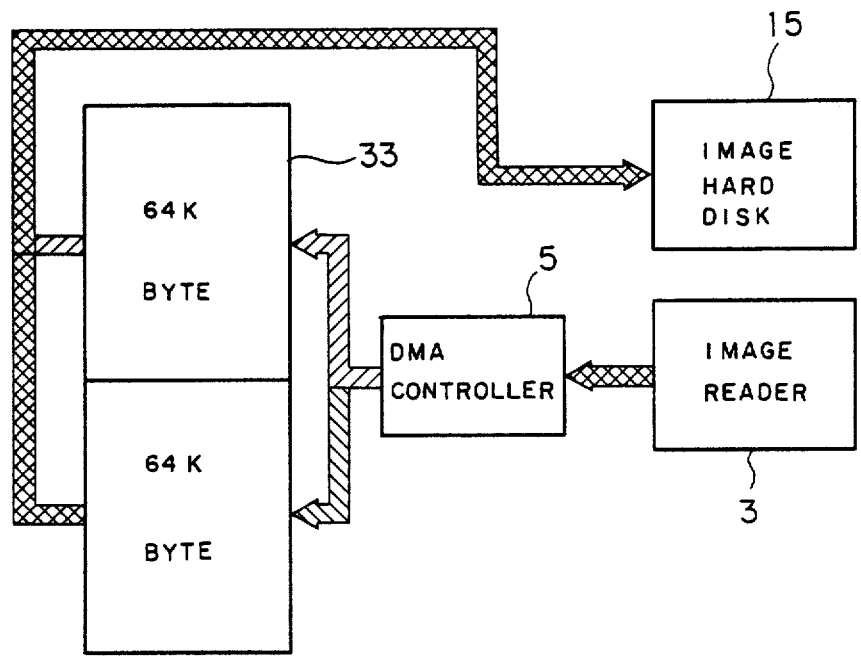
Figure 7:
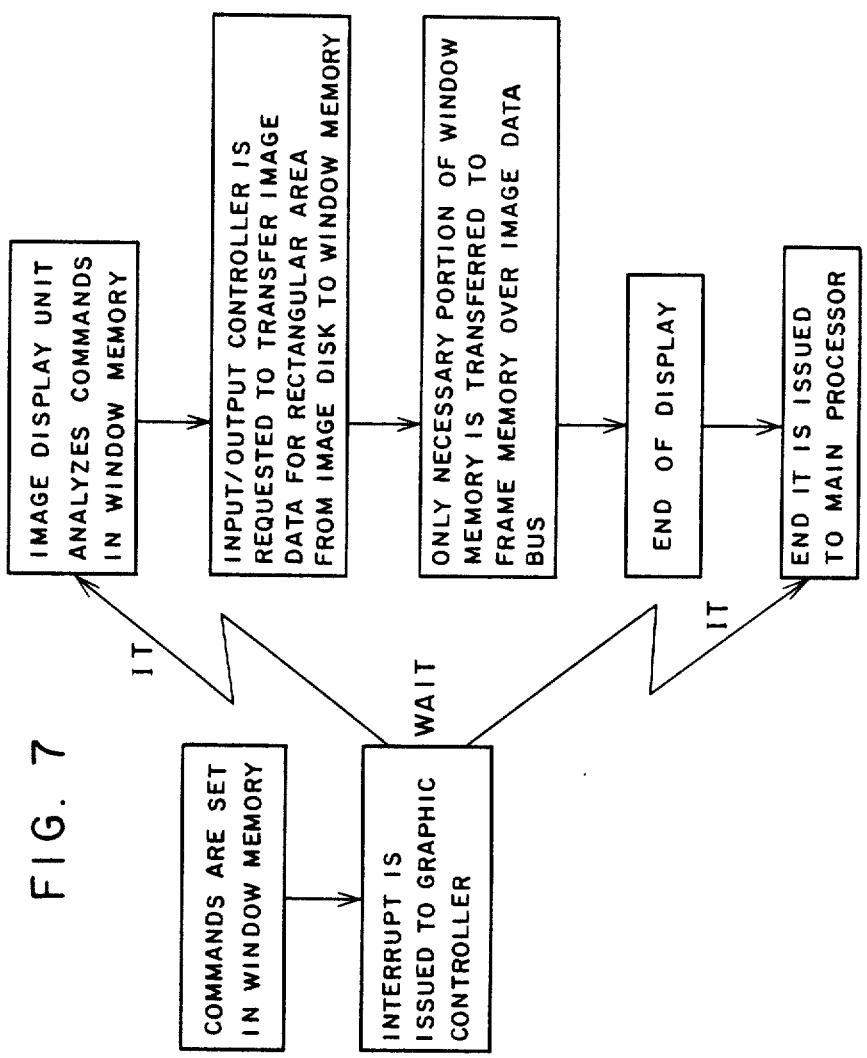

FIG. is a flowchart used to explain the initialization process of the system shown in FIG. 2;

FIG. 5 is a flowchart used to explain the interrupt process of the system shown in FIG. 2;

FIG. 6 is a block diagram showing the data flow in the system shown in FIGS. 2 and 3, and FIG. 7 is a flowchart explaining the general progression of the system shown in FIGS. 2 and 3.

DESCRIPTION OF THE PREFERRED EMBODIMENT

An embodiment of this invention will now be described with reference to the drawings.

Figure 1:
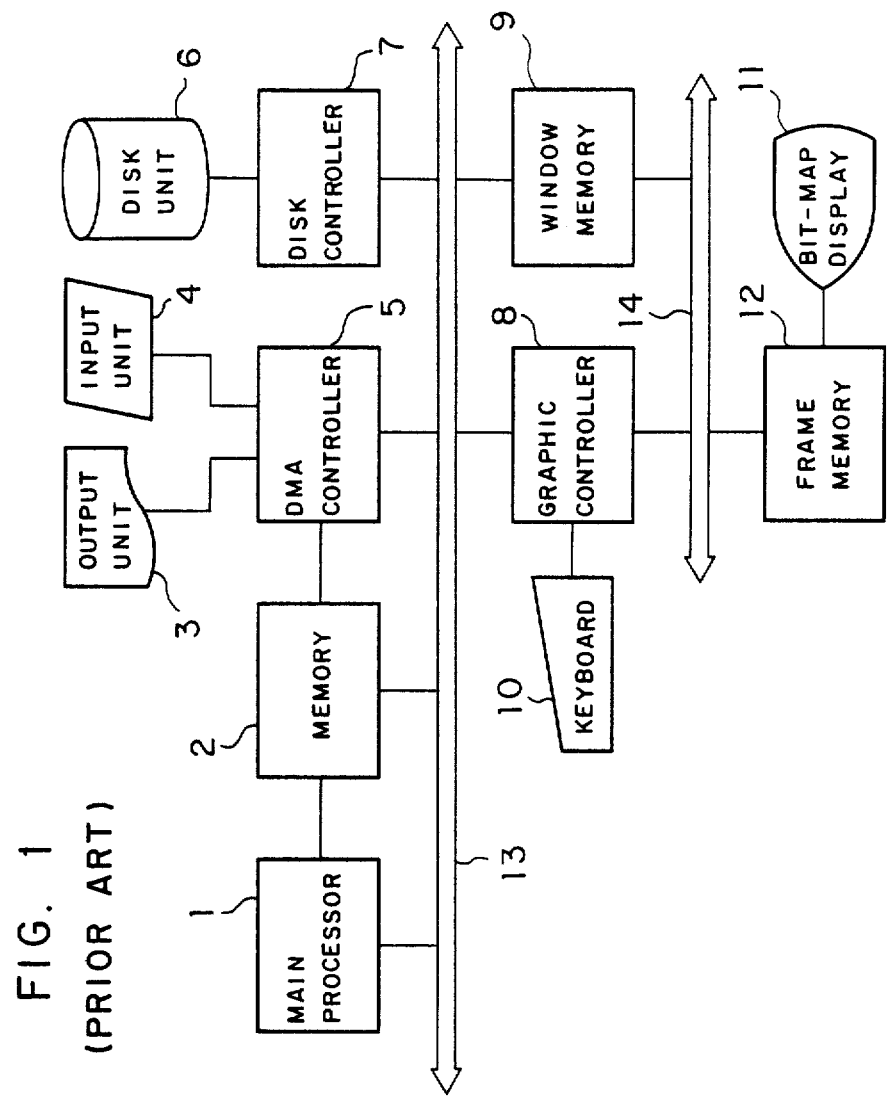
FIG. 1 is a block diagram showing an example of conventional work station systems handling image data.

In FIG. 2, where functional blocks identical to those of FIG. 1 are referred to by the common symbols, the inventive system further includes an image data dedicated disk unit 15, a disk input/output controller 16 inclusive of a DMA controller 5, a common bus 13 connecting the main processor part and the part of the graphic controller 8, and an image data bus 14 dedicated to high-speed data transaction among the frame memory 12 and disk input/output controller 16.

The disk input/output controller 16, shown in FIG. 3, incorporates a control bus interface 21, address bus interface 22 and data bus interface 23 all in connection with the image data bus 14. An internal bus 24 connects an output unit interface 25 and an input unit interface 26. The control, address and data bus interfaces 21, 22 and 23 are connected through internal buses 24 with a control buffer 27, address buffer 28, 32-bit data buffer 29 and 8-bit data buffers 30. Other functional blocks included are an address decode command generation interface circuit 31, a 2-port selector 32, a 2-port memory 33, data bus selectors 34 and 35, a DMA controller request circuit 36, and a timer 37.

Next, the operation of the input/output controller 16 in the inventive work station will be described using FIGS. 4, 5 and 6. FIGS. 4 and 5 show in flowchart the operation of the initialization process and interrupt process for image data implemented by the input/output controller 16 for the case of the control of the A1 image scanner shown in FIG. 3 as example.

Initially, image data to be processed is supplied from the image data input unit 4, i.e., the A1 image scanner in this embodiment, to the input/output controller 16 through the input interface 25. Once the A1 image scanner is activated, image data enters continuously through a channel of the DMA controller 5. The input data is accumulated sequentially in the 2-port memory 33 (64KB×2), and when the amount of input has reached 64K bytes, the transfer address of the DMA controller 5 is set to the top of another buffer. Another channel of the DMA controller 5 transfers input data held in one area of the 2-port memory 33 to the hard disk unit 15 and, on completion of this transfer, transfers the contents of the next area to the image data disk unit 15 (ST1A-ST4A in FIG. 4). This transfer operation is timed by a synchronous interrupt action by the DMA controller 5 issued to the input/output controller 16 (ST1B-ST3B in FIG. 5)

The flow of transferred data is as shown in FIG. 6, in which data transfers indicated by hatching in the same angle take place concurrently. By implementing the above transfer operation continuously and at a high speed, data transfer between the A1 image scanner and the hard disk 15 is processed in a short time. The DMA controller 5 incorporated in the input/output controller 16 in this embodiment has a function of automatically setting the next starting address and count on completion of the previous data transfer, which enables continuous access to the image hard disk.

Next, the operation of the overall work station equipped with the foregoing input/output controller 16 will be described. FIG. 7 shows the general process of the work station. Image data supplied from the data input unit 4 is conducted through the disk input/output controller 16 and stored in the window memory 9 or image data disk 15 as selected by the user. It is also possible to transfer image data directly to the frame memory 12, with processing being made for the data. In any case only the image data bus 14 is used for the data transfer, and it does not interfere with the common bus 13 at all. The display operation on the bit-map display unit 11 takes place by developing a screen image in the frame memory 12 as in the conventional system. For outputting image data to the image data output unit 3, image data in the format of the output unit is prepared in advance in the window memory 9 or prepared in advance in the image disk 15, and the data is transferred to the image data output unit 3 by the DMA function of the disk input/output controller 16. Also in this case, only the image data bus 14 is used or no bus is used (i.e., DMA), and therefore the process can take place in a short time. Accordingly, the higher devices above the common bus 13 control the overall system, while the lower devices are devoted to the graphic process, and this function allocation avoids bus scrambling in the system.

Provision of the image dedicated disk allows continuous storing and retrieval of image data on the disk, resulting in a considerable reduction in the access time as compared with the general-purpose OS file system.

According to the inventive work station dealing with image data, the image disk and image data input/output unit are integrated as a disk input/output controller and it is disposed on the graphic data bus so that the main processor and graphic processor have their functions separated, whereby mass image data can be transferred efficiently at a high speed.

What is claimed is:

1. A work station for processing image data having a main processor, a main processor memory and a direct memory access (DMA) controller all connected to a common bus, a graphic processor and a window memory each connected between said common bus and an image data bus, and a frame memory having an image display unit and being connected to said image data bus, said work station comprising:

image data memory means for storing image data, said image data memory means being connected to said image data bus;

memory input/output control means provided between said image data bus and said image data memory means for processing image data stored in said image data memory means using a direct memory access (DMA) function; and image data input means and image data output means connected to said memory input/output control means;

said image data output means outputting image data transferred by said memory input/output control means, and said image data input means inputting image data to be stored through said memory input/output control means.

2. A work station according to claim 1, wherein said common bus is connected with a data memory means for storing data other than said image data, said common bus being connected with a memory control means for controlling said data memory means.

3. A work station according to claim 1, wherein said graphic processor comprises a graphic control unit, which includes an input unit for operation of said work station.

4. A work station according to claim 1, wherein said image display unit connected to said frame memory comprises a bit-map display unit.

5. A work station according to claim 1, wherein said image data memory means comprises a magnetic disk unit.

* * * * *

UNITED STATES PATENT AND TRADEMARK OFFICE
CERTIFICATE OF CORRECTION

PATENT NO. : 4,811,281

DATED : March 7, 1989

INVENTOR(S) : Takashi Okamoto et al.

It is certified that error appears in the above-identified patent and that said Letters Patent is hereby corrected as shown below:

Column 2, line 42, after "FIG." insert --4--.

Signed and Sealed this

Twenty-fourth Day of April, 1990

Attest:

HARRY F. MANBECK, JR.

*Attesting Officer*   *Commissioner of Patents and Trademarks*